(12) United States Patent
Green et al.

(10) Patent No.: US 7,907,657 B2
(45) Date of Patent: *Mar. 15, 2011

(54) DIGITAL INTERFACE AND RELATED EVENT MANAGER FOR INTEGRATED CIRCUITS

(75) Inventors: Brian D. Green, Austin, TX (US);
Srihari Adireddy, Austin, TX (US);
Lysander Lim, Austin, TX (US);
Ramkishore Ganti, Dripping Springs, TX (US)

(73) Assignee: Silicon Laboratories Inc., Austin, TX (US)

( * ) Notice: Subject to any disclaimer, the term of this patent is extended or adjusted under 35 U.S.C. 154(b) by 1030 days.

This patent is subject to a terminal disclaimer.

(21) Appl. No.: 11/478,924

(22) Filed: Jun. 30, 2006

(65) Prior Publication Data

US 2006/0245483 A1 Nov. 2, 2006

Related U.S. Application Data

(63) Continuation of application No. 11/301,521, filed on Dec. 13, 2005, now Pat. No. 7,583,937.

(60) Provisional application No. 60/674,784, filed on Apr. 26, 2005.

(51) Int. Cl.
*H04B 1/38* (2006.01)
*H04L 5/16* (2006.01)

(52) U.S. Cl. ........ 375/220; 375/219; 375/267; 375/295; 375/316

(58) Field of Classification Search .................. 375/219, 375/220, 295, 267, 316; 455/250.1, 63.1
See application file for complete search history.

(56) References Cited

U.S. PATENT DOCUMENTS

| 7,457,586 | B1 * | 11/2008 | Hietala et al. ............... 455/63.1 |
| 2004/0166823 | A1 * | 8/2004 | Alderton .................... 455/250.1 |
| 2006/0050812 | A1 | 3/2006 | Hietala et al. |
| 2006/0239337 | A1 * | 10/2006 | Green et al. .................. 375/219 |
| 2007/0071129 | A1 | 3/2007 | Welland |
| 2007/0104098 | A1 | 5/2007 | Kimura et al. |
| 2007/0190952 | A1 | 8/2007 | Waheed et al. |

FOREIGN PATENT DOCUMENTS

| WO | WO 02/13493 A1 | 2/2002 |
| WO | WO 2004/030228 A2 | 4/2004 |
| WO | WO 2006115928 | 11/2006 |

OTHER PUBLICATIONS

Andrew Fogg, "DigRF—Baseband/RF Digital Interface Specification," Feb. 20, 2004, pp. 1-28.
PCT/US2006/014700 International Search Report with Written Opinion of the International Searching Authority Mailed Jul. 28, 2006.
Silicon Laboratories, "Aero IIed DigRF Interface Transceiver and ABB for GSM/GPRS/EDGE," Sep. 18, 2006, pp. 1-2.
U.S. Patent and Trademark Office, Office Action dated Jan. 7, 2010 with Reply filed on Apr. 5, 2010, in U.S. Appl. No. 11/731,869.

* cited by examiner

*Primary Examiner* — Ted M Wang
(74) *Attorney, Agent, or Firm* — Trop, Pruner & Hu, P.C.

(57) ABSTRACT

In one embodiment, the present invention includes a transceiver coupled to a baseband processor to receive digital control information that includes both event and schedule information, and which stores the digital control information in a storage of the transceiver. The transceiver may then be operated according to the event and schedule information.

17 Claims, 6 Drawing Sheets

DIGITAL INTERFACE AND RELATED EVENT MANAGER FOR INTEGRATED CIRCUITS

This application is a continuation of U.S. patent application Ser. No. 11/301,521 filed Dec. 13, 2005 now U.S. Pat. No. 7,583,937 entitled "DIGITAL INTERFACE AND RELATED EVENT MANAGER FOR INTEGRATED CIRCUITS," the content of which is hereby incorporated by reference, and which claims priority to U.S. Provisional Patent Application No. 60/674,784 filed on Apr. 26, 2005 in the name of Brain D. Green and Srihari Adireddy entitled DIGITAL INTERFACE AND RELATED EVENT MANAGER FOR INTEGRATED CIRCUITS.

FIELD OF THE INVENTION

This invention relates to high frequency communications and, more particularly, to wireless communication systems such as cellular telephones.

BACKGROUND

A wireless device such as a cellular telephone typically includes various components that communicate status, control and data information to each other. For example, a cellular telephone typically includes a transceiver that is adapted to transmit and receive at radio frequencies (RF). Cellular telephones further include a baseband processor that operates at baseband frequencies. Typically, information used to control the transceiver is provided from the baseband processor via analog signals on multiple pins, such as general purpose input/output (GPIO) pins. Additionally, baseband processors typically transmit radio data (e.g., voice information) to the transceiver via analog signals. Because there is a significant amount of information that is needed to be transferred, numerous such pins are needed, raising complexity, cost and consuming additional chip real estate.

For various reasons, digital interface communication protocols have been discussed in the communications industry, particularly with respect to cellular phones. One such effort has resulted in the DigRF Baseband/RF Digital Interface Specification currently available at the following URL on the Internet at the following URL—http://www.ttpcom.com/digrf. This specification defines certain logical, electrical and timing characteristics for a digital interface between an RF integrated circuit (RFIC), such as a transceiver, and a baseband processor. Part of this specification discusses a strobe signal that is sent by the baseband processor to the RFIC to precisely time events that will occur within the RFIC during transmit and/or receive sessions. Because the amount of event information being fed from the baseband processor to the RFIC can be considerable, the time required to send the event information to the RFIC can be large enough to interfere with the performance of the RFIC. The DigRF specification does not provide an efficient solution to this problem.

In addition to the amount of information sent, the fact that data and control information may now occur digitally raises concerns. Specifically, transmission of digital signals between a baseband processor and transceiver during the transceiver's transmit and receive sessions can cause undesired interference or other ill effects. Accordingly, a need exists to effectively use the availability of digital communication while avoiding such adverse effects.

SUMMARY OF THE INVENTION

The present invention provides a digital interface and event manager for integrated circuits. More particularly, the present invention provides an event control protocol for efficiently handling strobed events in transceiver integrated circuits that digitally communicate transmit and receive signals to baseband processor integrated circuits.

In one aspect, the present invention includes a storage medium including instructions that enable a system to receive digital control information in a transceiver of the system from a processor of the system. The digital control information includes configuration information. Upon receipt of the configuration information, the transceiver stores it in at least one storage of the transceiver, and the transceiver is configured according to the configuration information. Still further, the instructions may enable the transceiver to receive event information and schedule information from the processor and store it in an event storage of the transceiver.

Yet another aspect is directed to an apparatus that includes a digital control interface to receive digital control information from a baseband processor, an event storage coupled to the digital control interface to store at least a first portion of the digital control information, a configuration storage coupled to the digital control interface to store at least a second portion of the digital control information, and a non-volatile memory coupled to the configuration storage that may include predetermined configuration information. In one implementation, the event storage may include a plurality of registers each to store an event code and a corresponding schedule code, and the configuration storage may include a receive configuration storage and a transmit configuration storage.

While the scope of the present invention is not limited in this regard, the configuration storage may store transmit configuration information received in one or more telegrams sent while the apparatus is in a standby state. Such telegrams may further include event codes and corresponding schedule codes. Also during periods of radio frequency inactivity, the apparatus may receive one or more strobe signals that can be used to initiate one or more actions in the apparatus after the radio frequency inactivity.

Some embodiments may be in the form of a system, such as a wireless system, that includes a processor and a transceiver, in which the transceiver has a digital interface to communicate digital control information between the processor and transceiver and a control storage to store the digital control information received from the processor. The transceiver may further include a non-volatile memory to store transmission patterns, which may be addressed by an event code according to a corresponding schedule code. The transceiver may be configured to communicate according to multiple modulation schemes such as an 8 PSK mode and a GMSK mode. The system may further include a power amplifier coupled to the transceiver and an antenna coupled to the power amplifier to transmit and receive information. Embodiments of the present invention may be implemented in appropriate hardware, firmware, and software. To that end, one embodiment may be implemented in a system for wireless transmission. Still other embodiments may include a system including an integrated circuit such as a transceiver along with additional components.

BRIEF DESCRIPTION OF THE DRAWINGS

It is noted that the appended drawings illustrate only exemplary embodiments of the invention and are, therefore, not to be considered limiting of its scope, for the invention may admit to other equally effective embodiments.

DETAILED DESCRIPTION

Embodiments of the present invention provide a digital interface and event manager that can be used for communications between integrated circuits. More particularly, embodiments may provide an event control protocol for efficiently handling strobed events in transceiver integrated circuits that digitally communicate transmit and receive signals with baseband processor integrated circuits.

In various embodiments, digital communication between a baseband processor and transceiver may be efficiently handled using various schemes. First, the amount of control information sent to a transceiver may be minimized in various ways. For example, the control information may be encoded to reduce its size. Furthermore, in some embodiments one or more tables may be provided in the transceiver that include specified control information. Accordingly, to enable use of this control information, a minimal amount of communication between baseband processor and transceiver is used. While the amount of control information to be sent to a transceiver may be concise, a sufficient amount of control information to maintain desired functional ability and flexibility may be sent. In some embodiments, a total time consumed in sending control information may be reduced such that desired control information is able to be sent while avoiding interference. Still further, control information may be communicated in carefully selected time periods relative to transmit and receive sessions, to avoid undesired interference.

Based upon this control information, a transceiver may be ultimately responsible for its own scheduling of activities. That is, instead of simply receiving commands from a baseband processor and undertaking actions in response to the commands, a transceiver in accordance with an embodiment of the present invention schedules and performs events under its own control, based upon the received control information. Thus the transceiver is the ultimate authority for implementing its own schedule.

Figure 1:
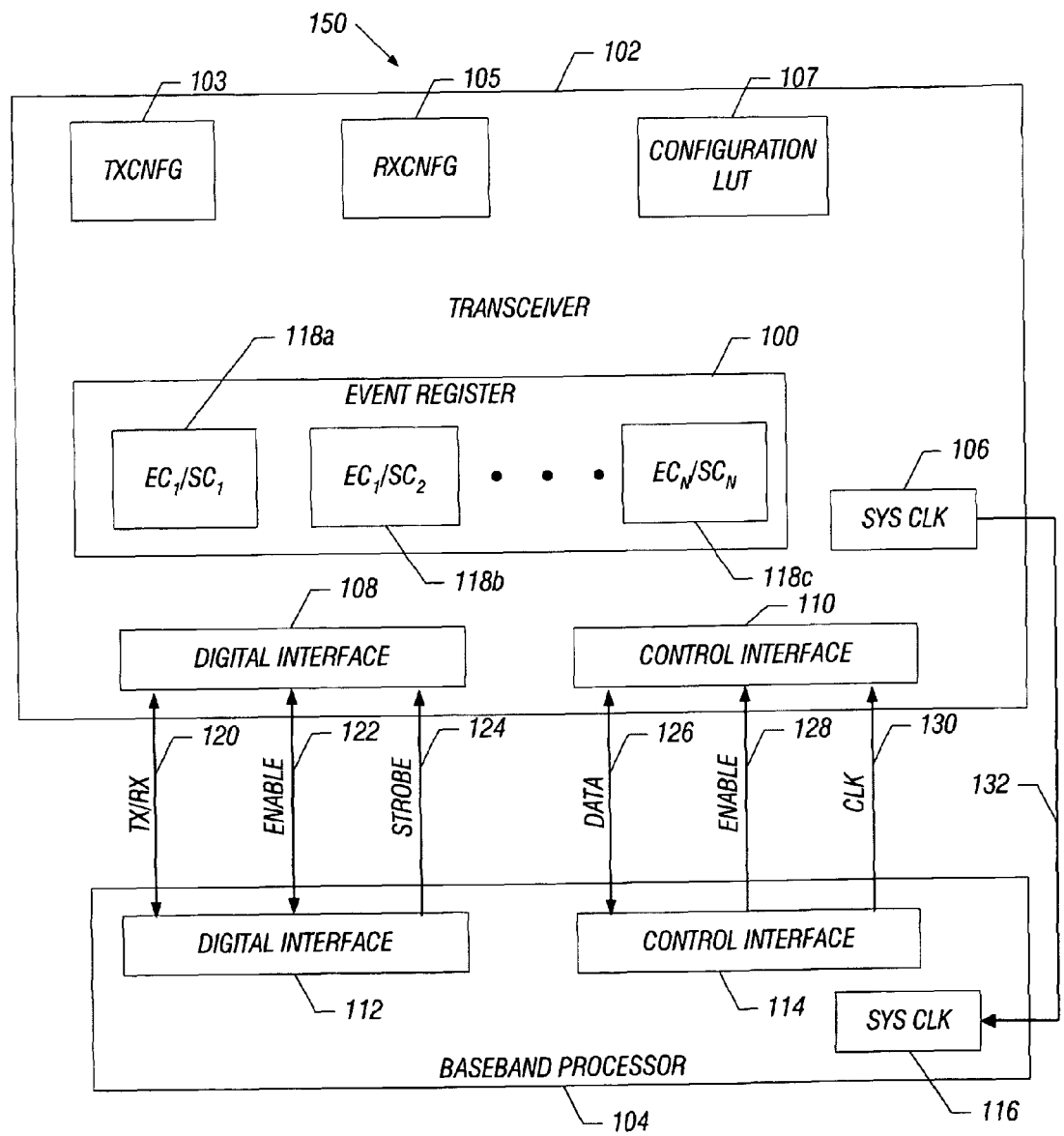
FIG. 1 is a block diagram for an embodiment of the present invention.

FIG. 1 is a block diagram for an embodiment 150 according to the present invention. A transceiver integrated circuit 102 communicates with a baseband processor integrated circuit 104 through various input/output pins. While shown in the embodiment of FIG. 1 as being separate integrated circuits, it is to be understood that in some embodiments a single integrated circuit may house both baseband processing functions and transceiver functions. Furthermore, additional functionality may be integrated into one or more integrated circuits in accordance with an embodiment of the present invention.

As shown, the digital interface 108 on the transceiver 102 communicates with the digital interface 112 on the baseband processor 104 using a transmit/receive (TX/RX) signal line 120, an ENABLE signal line 122, and a STROBE signal line 124. The TX/RX signal line 120 is used to send and receive digital data representing data being sent and received by a communication device within which the transceiver 102 and the baseband processor 104 are operating, such as a cellular phone. The ENABLE signal line 122 is used to send and receive transmit/receive data enable signals between the transceiver 102 and the baseband processor 104. And the STROBE signal line 124, as discussed above, is used by the baseband processor 104 to precisely time events that will occur within the transceiver 102 during transmit and/or receive sessions.

The control interface 110 on the transceiver 102 communicates with the control interface 114 on the baseband processor 104 using a DATA signal line 126, an ENABLE signal line 128, and a clock (CLK) signal line 130. The DATA signal line 126 is used to communicate control data between the transceiver 102 and the baseband processor 104. The ENABLE signal line 128 is used to send control data enable signals between the baseband processor 104 and the transceiver 102. The CLK signal is used by the baseband processor 104 to send a control clock signal to the transceiver 102. In some embodiments, a single interface between baseband processor 104 and transceiver 102 may be used for communication of all of the above signals.

With respect to the embodiment depicted, it is also noted that that transceiver 102 is the system clock master. As such, the system clock (SYS CLK) block 106 on the transceiver provides a system clock signal through signal line 132 to the system clock (SYS CLK) block 116 on the baseband processor 104.

According to the present invention, the transceiver 102 includes an event register 100 that is loaded with event data provided at least in part from control data transfers from the baseband processor 104 to the transceiver 102. The event register 100 stores a plurality of events as represented by elements 118A, 118B . . . 118C, and each event includes an event code (EC) and a schedule code (SC). Event 118A, therefore, includes event code EC1 and schedule code SC1. Event 118B, therefore, includes event code EC2 and schedule code SC2, and so on, until the last event is reached, and this event 118C includes event code ECN and schedule code SCN.

The event code (EC) can be represented by a multiple bit value that identifies an action to be taken by the transceiver 102. The schedule code (SC) can be represented by a multiple bit value that identifies a time at which the action will be taken. As set forth below in some embodiments, this time can be relative to the preceding event, tied to a strobe event, or set to occur simultaneously with the preceding event.

As indicated above, the STROBE signal line 124 is utilized to control timing of the events. In the DigRF protocol discussed above, a quarter-bit timing convention is used. As such, a strobe event is defined such that the strobe signal stays high for exactly one-fourth quarter-bit, and the time between strobe events is always an integer number of quarter-bits. It is noted that a quarter-bit refers to 4 times the data symbol rate. Assuming a 26 MHz clock, the data symbol rate can be configured to be 26 MHz/(24*4). A quarter-bit then would be 26 MHz/24. It is also noted that the DigRF protocol does not specify the details of how the transceiver 102 interprets the strobe event, so both edges of the strobe signal could be utilized for timing if desired.

A NULL event action code can be provided to provide additional flexibility in event configuration. This NULL event, for example, can be used to extend the length between any two active events by including events with the NULL event code and the largest schedule code. In the embodiment set forth in the Tables below this would take the form of "0000" for the event code (NULL event) and "1110" for the schedule code (+14 quarter-bits after the preceding event).

By providing an event code and a schedule code that make up an event, complex event scheduling can be accomplished while still allowing for efficient communication of event information from the baseband processor 104 to the transceiver 102.

Still referring to FIG. 1, additional storage may be present to store specific control information. For example, one or more configuration registers may be present. These configuration registers may be used to store configuration information used in setting up transceiver 102 for transmit and receive sessions. Thus as shown in FIG. 1, a transmit configuration register 103 (TXCONFIG) and a receive configuration register 105 (RXCONFIG) may be present. Furthermore, one or more additional storages, such as lookup tables (LUT) or the like may be used to store predetermined configuration information in a non-volatile fashion. Using such tables, the transceiver 102 can perform various activities using a minimal event code to access detailed configuration information stored in the table. Thus as shown in FIG. 1, a configuration lookup table 107 is present. While shown in the embodiment of FIG. 1 as including a single such table, in other embodiments additional tables may be used. As will be described further below, such tables may be used to store ramp pattern information, transmit sequences and the like.

Figure 2:
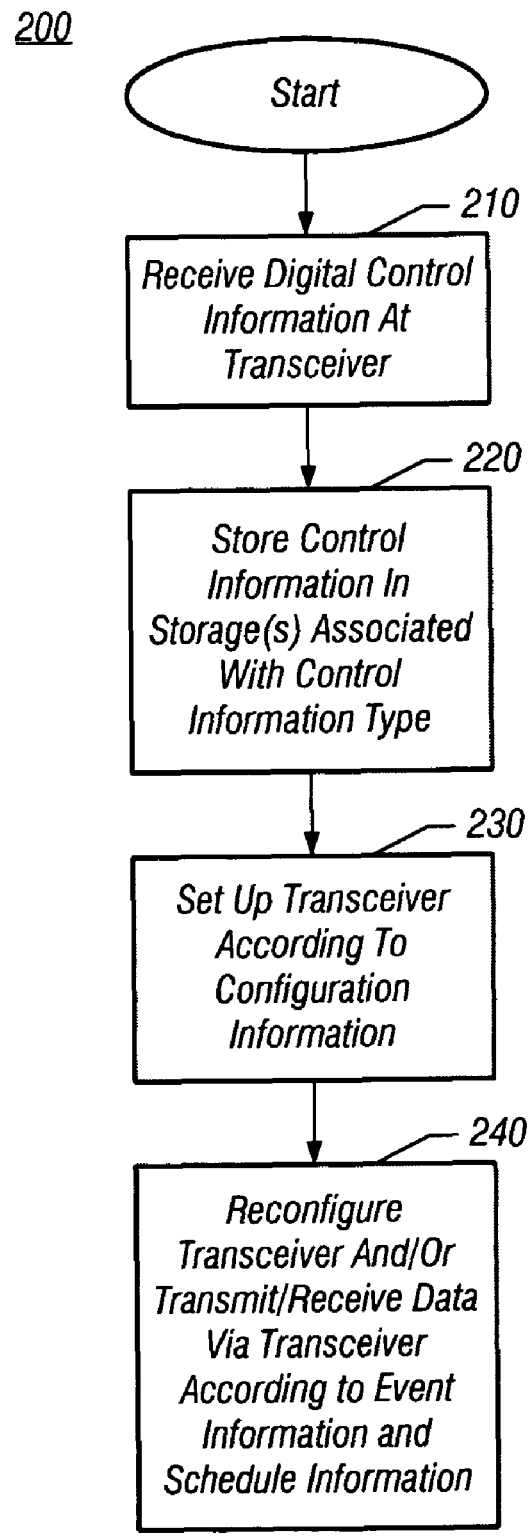
FIG. 2 is a flow diagram of a method in accordance with one embodiment of the present invention.

Referring now to FIG. 2, shown is a flow diagram of a method in accordance with one embodiment of the present invention. As shown in FIG. 2, method 200 may be used for transmitting digital control information between a baseband processor and a transceiver and then controlling the transceiver according to the control information. As shown in FIG. 2, digital control information may be received at a transceiver (block 210). For example, the digital control information may be sent via control interface 114 of baseband processor 104 to control interface 110 of transceiver 102. In various embodiments, this control information may include configuration information, event information, schedule information and the like. Furthermore, transmission of the digital control information may desirably avoid interference with transceiver (e.g., receive and transmit) operations.

Next the control information may be stored in one or more storages within the transceiver (block 220). More specifically, different control information may be stored in different registers, buffers or other storages associated with the given type of control information. For example, configuration information may be stored in one or more configuration registers and event information may be stored in one or more event registers. Similarly, schedule codes may be stored in the event registers or may separately be stored in dedicated schedule registers. Still further, in some embodiments particular control information may be stored in registers or other storages dedicated thereto. For example, ramp control information may be stored in a ramp buffer. Similarly, transmit control information (e.g., transmit patterns) may be stored in associated pattern buffers.

Still referring to FIG. 2, based on the configuration information that has been stored, the transceiver may be set up accordingly (block 230). For example, the transceiver may be enabled for transmit operations on a given frequency and various components of the transceiver may be initialized according to configuration information. Similar information may be used to appropriately set up a transceiver for a receive session.

Next, configuration information may be used to reconfigure one or more configuration parameters of the transceiver under control of event information. Furthermore, the transmit and/or receive operations may be performed using the transceiver based on event and schedule information stored in the transceiver (block 240). The event information may be accessed from the one or more storages in the transceiver according to schedule information also stored in the transceiver. Accordingly, transmit/receive operations may be performed. In some embodiments a digital strobe signal sent from digital interface 112 of baseband processor 104 to digital interface 108 of transceiver 102 may activate certain actions in the transceiver according to event codes that are scheduled to occur upon receipt of such strobe signals. Other events or actions that are to occur in the transceiver may be initiated at certain timing patterns (e.g., a number of clock signals) from a prior received strobe signal. In such manner, transmission of control information is reduced as much as possible while maintaining desired flexibility and functionality of the wireless device.

In one example, the control data is communicated from the baseband processor 104 to the transceiver 102 using a 32-bit word or telegram. With respect to event information, a telegram can include a read bit, 6 address bits, three 8-bit events, and a final bit representing whether or not the telegram is the first event telegram. In turn, each 8-bit event can include a 4-bit event code and a 4-bit schedule code. The event register 100 is configured to store these events and can be, for example, a 25-bit wide register having 12 rows.

In one embodiment, configuration and event management for a transceiver may use three registers: RXCONFIG register 105, TXCONFIG register 103, and event register 100. Each of these registers may appear at a specific single address in a device's register map. However, this address may serve as a port into a FIFO that stores the information to be used during a transceiver session under control of a strobe signal. In one such embodiment, the RXCONFIG and TXCONFIG registers 103 and 105 may have a FIFO depth of 4 items, corresponding to a maximum of four possible active slots in a multi-slot burst in a TDMA system. In this embodiment the event register 100 may have a much larger FIFO depth (e.g., 42), which allows for flexible sequencing of numerous events in a single multi-slot burst.

Logically, each register may be addressed through a 6-bit address, and may be 25 bits wide. This maps onto a 32-bit telegram size with 1 read bit, 6 address bits, and 25 data bits. When the number of assigned data bits in any register is fewer than 25, the assigned bits may be aligned with the least significant data bits in the 32-bit telegram in some embodiments.

In all three FIFOs, pointer initialization can be accomplished through the use of the most-significant data bit, designated FIRSTIN. If FIRSTIN is asserted during a register write, this indicates that the corresponding FIFO read pointer is to be set to the FIFO entry being presently written.

Referring now to the RXCONFIG register 105, each write to it may place up to two 12-bit configuration items, RXCFGN+1 and RXCFGN, in the FIFO as described below in Table 1, which shows an example of RXCONFIG register contents.

TABLE 1

| | DATA BITS: | | |
|---|---|---|---|
| | 24 | 23:12 | 11:0 |
| CONTENTS: | FIRSTIN | $RXCFG_{N+1}[11:0]$ | $RXCFG_N[11:0]$ |

During a receive burst, the RXCFG items are applied in order of increasing index, relative to the write in which FIRSTIN=1. For example, if there have been two writes to the RXCONFIG register 105, with FIRSTIN=1 in the first write, and FIRSTIN=0 in the second, then the RXCFG items may be applied in the following order: N from the first write, N+1 from the first write, N from the second write, and N+1 from the second write.

Bit definitions for the items to be stored in the RXCONFIG register 105 in accordance with one embodiment of the present invention are as described below in Table 2.

TABLE 2

| RXCFG BITS | MNEMONIC and DESCRIPTION |
|---|---|
| 11 | reserved |
| 10 | FILTSEL - Select one of two RX filters. |
| 9 | LNAG - LNA gain low (0) or high (1). |
| 8:6 | AGAIN[2:0] - Analog gain; 4 settings in +4 dB increments from code 0 |
| 5:0 | DGAIN[5:0] - Digital gain; 64 settings in +1 dB increments from code 0 |

With reference now to the TXCONFIG register 103, each write may place up to two 12-bit configuration items, TXCFGN+1 and TXCFGN, as described below in Table 3, which shows an example of TXCONFIG register contents.

TABLE 3

| | DATA BITS: | | |
|---|---|---|---|
| | 24 | 23:12 | 11:0 |
| CONTENTS: | FIRSTIN | $TXCFG_{N+1}[11:0]$ | $TXCFG_{N}[11:0]$ |

During a transmit burst, the items stored in the TXCONFIG register 103 are applied in order of increasing index, relative to the write in which FIRSTIN=1. For example, if there have been two writes to the TXCONFIG register, with FIRSTIN=1 in the first write, and FIRSTIN=0 in the second, the TXCFG items may be applied in the following order: N from the first write, N+1 from the first write, N from the second write, and N+1 from the second write.

Bit definitions for the items stored in the TXCONFIG register 103 in accordance with one embodiment of the present invention are as described below in Table 4.

TABLE 4

| TXCFG BITS | MNEMONIC and DESCRIPTION |
|---|---|
| 11:8 | VBIAS[3:0] - PA bias value |
| 7 | TXMODE - GMSK (0) or 8PSK (1). |
| 6:0 | DVGA[6:0] - Digital gain control in 0.5 dB steps (8PSK modes). |

With regard to the VBIAS[3:0] bits, if a transceiver has been configured for analog power amplifier (PA) bias, this value may be applied directly to the VBIAS digital-to-analog converter (DAC). If the transceiver has been configured for logical (binary) PA bias, any value less than or equal to 4'b0111 is interpreted as a logic 0 (low bias), and any value greater than this is interpreted as logic 1 (high bias).

Referring now to the event register 100, each write thereto may place three 4-bit event codes $EC_{N+2}$, $EC_{N+1}$, and $EC_N$, along with their corresponding 4-bit scheduling codes $SC_{N+2}$, $SC_{N+1}$, and $SC_N$, in the FIFO as described below in Table 5, which shows an example of event register contents.

TABLE 5

| | DATA BITS: | | | |
|---|---|---|---|---|
| | 24 | 23:20, 19:16 | 15:12, 11:8 | 7:4, 3:0 |
| CONTENTS: | FIRSTIN | $EC_{N+2}[3:0]$, $SC_{N+2}[3:0]$ | $EC_{N+1}[3:0]$, $SC_{N+1}[3:0]$ | $EC_N[3:0]$, $SC_N[3:0]$ |

During a burst, event and schedule codes may be applied in order of increasing index, relative to the write in which FIRSTIN=1. For example, if there have been three writes to the event register 100, with FIRSTIN=1 in the first write and FIRSTIN=0 in the subsequent writes, the event codes may be applied in the following order: N from the first write, N+1 from the first write, N+2 from the first write, N from the second write, N+1 from the second write, N+2 from the second write, N from the third write, N+1 from the third write, N+2 from the third write.

Meanings of event codes in accordance with one embodiment of the present invention are described below in Table 6.

TABLE 6

| EVENT CODE | EVENT MNEMONIC and DESCRIPTION |
|---|---|
| 4'b0000 | NUL - Null event (no action; used as placeholder or to extend scheduling) |
| 4'b0001 | PDN - Power down transceiver |
| 4'b0010 | PUP - Power up transceiver and reset TX symbol FIFO |
| 4'b0011 | NXT - Advance configuration FIFO (RX or TX) to next configuration |
| 4'b0100 | RPE - Ramp enable |
| 4'b0101 | RPD - Ramp disable |
| 4'b0110 | PAD - PA disable |
| 4'b0111 | PAE - PA enable |
| 4'b1000 | SW0 - Antenna switch control state 0 |
| 4'b1001 | SW1 - Antenna switch control state 1 |
| 4'b1010 | SW2 - Antenna switch control state 2 |
| 4'b1011 | SW3 - Antenna switch control state 3 |
| 4'b1100 | SW4 - Antenna switch control state 4 |
| 4'b1101 | MDD - TX modulator disable (stop consuming TX symbols) |
| 4'b1110 | MDE - TX modulator enable (start consuming TX symbols) |
| 4'b1111 | reserved |

Meanings of the schedule codes in accordance with one embodiment of the present invention are described below in Table 7.

TABLE 7

| SCHEDULE CODE | SCHEDULE MNEMONIC and DESCRIPTION |
|---|---|
| 4'b0000 | +0 - Activate this event simultaneously with the preceding event. |
| 4'b0001 | +1 - Activate this event 1 quarter-bit after the preceding event. |
| 4'b0010 | +2 - Activate this event 2 quarter-bits after the preceding event. |
| 4'b0011 | +3 - Activate this event 3 quarter-bits after the preceding event. |

TABLE 7-continued

| SCHEDULE CODE | SCHEDULE MNEMONIC and DESCRIPTION |
|---|---|
| 4'b0100 | +4 - Activate this event 4 quarter-bits after the preceding event. |
| 4'b0101 | +5 - Activate this event 5 quarter-bits after the preceding event. |
| 4'b0110 | +6 - Activate this event 6 quarter-bits after the preceding event. |
| 4'b0111 | +7 - Activate this event 7 quarter-bits after the preceding event. |
| 4'b1000 | +8 - Activate this event 8 quarter-bits after the preceding event. |
| 4'b1001 | +9 - Activate this event 9 quarter-bits after the preceding event. |
| 4'b1010 | +10 - Activate this event 10 quarter-bits after the preceding event. |
| 4'b1011 | +11 - Activate this event 11 quarter-bits after the preceding event. |
| 4'b1100 | +12 - Activate this event 12 quarter-bits after the preceding event. |
| 4'b1101 | +13 - Activate this event 13 quarter-bits after the preceding event. |
| 4'b1110 | +14 - Activate this event 14 quarter-bits after the preceding event. |
| 4'b1111 | # - Wait for a new real time event STROBE to activate this event |

In some embodiments, a predetermined number of events can be scheduled for simultaneous activation. In order to allow the hardware sufficient time to process simultaneously scheduled events, an event scheduled for a new real-time strobe signal (e.g., SC=4'b1111) may be activated exactly one quarter bit later than the assertion of the real-time event STROBE signal.

In some embodiments, additional configuration registers, such as antenna switch configuration registers (e.g., SWRX and SWTX registers) may be present. Such registers may store switch events. For example, SW0-SW4 events may be read to determine the state of the antenna switch control pins SW[3:0] according to two configuration registers, SWRX and SWTX, within the configuration registers. The registers may be written during a transceiver's initialization, and may retain their values as long as a supply voltage is applied. The SWRX configuration register may control the mapping of SWx events to pin state during receive mode, and the SWTX configuration register may control the mapping of SWx events to pin state during transmit mode. When the transceiver is not active, the antenna switch control pins may all be held low. The contents of the SWRX and SWTX registers may be used directly to determine the SW[3:0] pin state associated with each SWx event as shown in Table 8, which is an example embodiment of SWRX and SWTX register contents.

TABLE 8

| | DATA BITS: | | | | |
|---|---|---|---|---|---|
| | 19:16 | 15:12 | 11:8 | 7:4 | 3:0 |
| CONTENTS: | SW[3:0] for event SW4 | SW[3:0] for event SW3 | SW[3:0] for event SW2 | SW[3:0] for event SW1 | SW[3:0] for event SW0 |

A ramp register, which may be a separate table storage, may include registers to hold a number of ramp profiles. Each profile may be defined by 19 samples at twice the symbol rate, in one embodiment. Two samples may be packed into each 32-bit telegram write, although only 20 total bits are stored for the write, 10 per sample. To update a sample, all 10 bits of the sample may be written in the same cycle. Each write of the ramp register may place two 10-bit samples, $RAMP_N$ and $RAMP_{N+1}$, into the FIFO as described in Table 9, which is an example embodiment of ramp register contents.

TABLE 9

| | DATA BITS: | | | |
|---|---|---|---|---|
| | 24 | 23:20 | 19:10 | 9:0 |
| CONTENTS: | FIRSTIN | reserved | $RAMP_{N+1}[9:0]$ | $RAMP_N[9:0]$ |

During the ramping part of a transmit burst, the ramp items are applied in order of increasing index relative to the write in which FIRSTIN=1. For example, if there have been two writes to the RAMP register, with FIRSTIN=1 in the first write, and FIRSTIN=0 in the second, the RAMP items may be applied in the following order: N from the first write, N+1 from the first write, N from the second write, and N+1 from the second write.

At the first ramp enable (RPE) event, the system starts consuming ramp FIFO data at the rate of 1 sample every 2 quarter bits, continuing until the next ramp disable (RPD) event. At the next RPE event, if no writes have been made to the ramp register, then the next sample in the FIFO is applied to the ramp output. If there have been writes to the ramp register where the FIRSTIN bit was set to 1, then the next sample will start from the newly flagged value.

Figure 3:
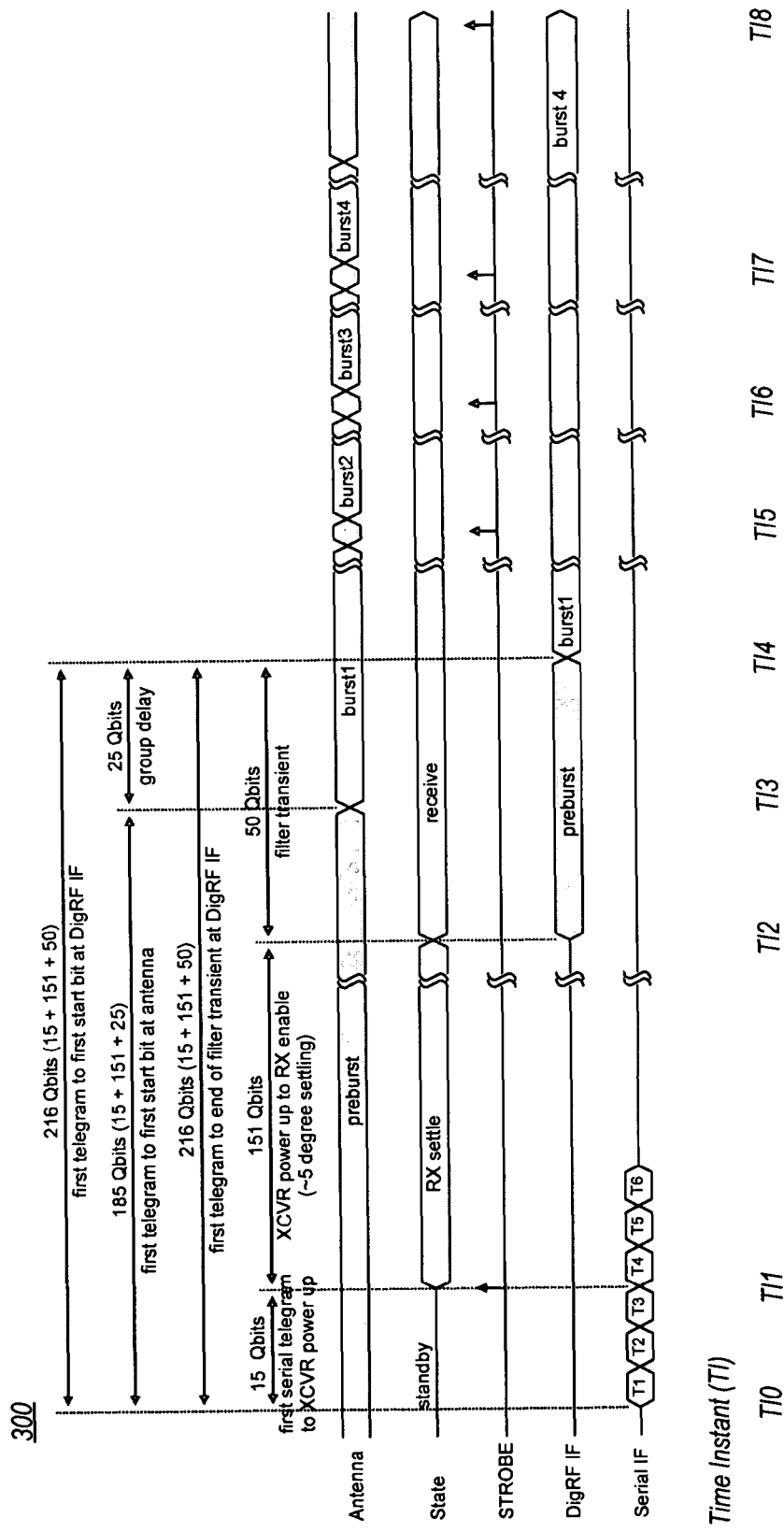
FIG. 3 is an example multi-slot receive timing diagram in accordance with one embodiment of the present invention.

Referring now to FIG. 3, shown is an example multi-slot receive timing diagram in accordance with one embodiment of the present invention. The timing diagram of FIG. 3 shows various activities and communications occurring in a wireless device during preparation for and receipt of burst data. Timing diagram 300 begins at a first programming event occurring at a time instant T10. Specifically, a plurality of serial control telegrams are sent from a baseband processor to a transceiver across a serial interface. In the embodiment shown in FIG. 3, six such serial control telegrams are sent, beginning with a first control telegram T1 and continuing successively through the sixth control telegram T6. Shown in Table 10 is example control information sent in the six telegrams T1-T6.

TABLE 10

| Serial Control Telegrams | |
|---|---|
| T1 - ARFCN | |
| T2 - RXCONFIG | |
| T3 - EVENTS 1-3: | PUP#, SWx+0, NXT# |
| T4 - RXCONFIG | |

TABLE 10-continued

| Serial Control Telegrams | |
|---|---|
| T5 - EVENTS 4-6: | NXT#, NXT#, PDN# |
| T6 - AFC | |

When the first serial control telegram is sent over the serial interface, an antenna of the wireless devices is in a pre-burst mode, and accordingly the transceiver is in a standby state. In the embodiment of FIG. 3, the standby state continues for twelve Qbits, at which time (TI1) a synthesizer of the transceiver begins settling. This settling time is initiated by a first strobe signal sent at TI1, which corresponds to the schedule code for this first event according to control information sent in the third control telegram, specifically, the power up (PUP) instruction for the transceiver.

After the synthesizer settles, the transceiver enters a receive state at time TI2 in which it is prepared to receive data received on the antenna. Similarly at this same time, the transceiver transmits preburst information over the data interface between baseband processor and transceiver (e.g., DigRF IF). At a next time instant (TI3), a first burst of a multi-slot communication is received at the antenna, while the transceiver remains in the receive state. At a next time instant TI4, the first portion of the first burst data, processed by the transceiver, is sent across the data interface to the baseband processor.

As further shown in FIG. 3, at various later time instances, a strobe signal is sent from the baseband processor to the transceiver. In various embodiments, these strobe signals may desirably be sent during periods of inactivity in the RF circuitry to avoid interference. Each of these strobe signals may initiate one or more events in the transceiver according to control information sent in the control telegrams. For example, in the embodiment of FIG. 3 at the second strobe (at TI5), the transceiver is enabled to receive and process a next burst of the communication (i.e., a second burst) according to the next (NXT) instruction sent in telegram T3. Similar activities occur upon receipt of the third and fourth strobe signals. Finally, upon receipt of the fifth strobe signal at TI8 the transceiver is instructed to power down according to the power down (PDN) event sent in the T5 control telegram.

While shown with this particular implementation in the embodiment of FIG. 3, it is to be understood the scope of the present invention is not so limited, and different control telegrams may be sent including different events and other information at different times with respect to a receive session.

Figure 4:
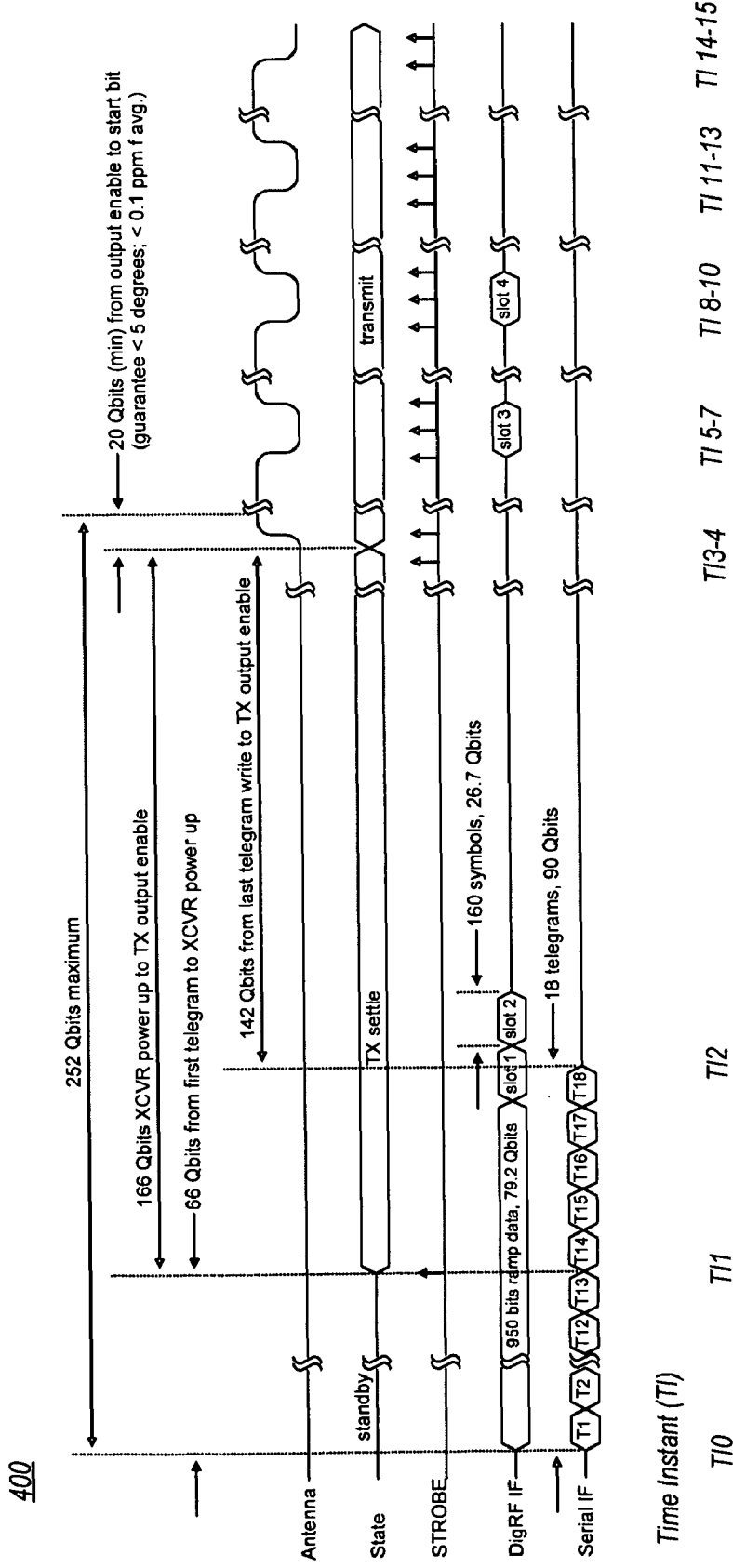
FIG. 4 is an example multi-slot transmit timing diagram in accordance with one embodiment of the present invention.

Referring now to FIG. 4, shown is an example multi-slot transmit timing diagram in accordance with one embodiment of the present invention. As shown in FIG. 4, timing diagram 400 shows an example transmission of serial control telegrams between a baseband processor and a transceiver, along with digital data transfer and transceiver operations in accordance with one embodiment of the present invention. Referring to FIG. 4, timing diagram 400 begins with the transmission of a first serial control telegram T1 at time instant TI0 (which may correspond to a first programming event for the transceiver) from a baseband processor to a transceiver on a serial interface. As shown in FIG. 4, a plurality of serial control telegrams are sent consecutively along the serial interface. While FIG. 4 shows the transmission of 18 such control telegrams, T1-T18, more or fewer such telegrams may occur in different embodiments. Shown below in Table 11 is example control information sent in the 18 telegrams T1-T18.

TABLE 11

| Serial Control Telegrams | |
|---|---|
| T1 - AFC | |
| T2 - ARFCN | |
| T3 - TXCONFIG | |
| T4 - TXCONFIG | |
| T5 - EVENTS 1-3: | PUP#, SWx#, PAE+1 |
| T6 - EVENTS 4-6: | RPE+5, MDE#, RPD+12 |
| T7 - EVENTS 7-9: | MDD#, RPE+12, PAD# |

TABLE 11-continued

| Serial Control Telegrams | |
|---|---|
| T8 - EVENTS 10-12: | SW+1, NXT+0, SWx+1 |
| T9 - EVENTS 13-15: | PAE+1, MDE#, RPD+12 |
| T10 - EVENTS 16-18: | MDD#, RPE+12, PAD# |
| T11 - EVENTS 19-21: | SW+1, NXT+0, SWx+1 |
| T12 - EVENTS 22-24: | PAE+1, MDE#, RPD+12 |
| T13 - EVENTS 25-27: | MDD#, RPE+12, PAD# |
| T14 - EVENTS 28-30: | SW+1, NXT+0, SWx+1 |
| T15 - EVENTS 31-33: | PAE+1, MDE#, RPD+12 |
| T16 - EVENTS 34-36: | MDD#, RPE+12, RPD# |
| T17 - EVENTS 37-39: | PAD+1, SWx+1, PDN+0 |
| T18 - EVENTS 40-42: | NUL+0, NUL+0, NUL+0 |

Still referring to FIG. 4, at time TI1, upon receipt of a first strobe signal sent by the baseband processor to the transceiver, the transceiver transitions from a standby state to a settling state, where various transceiver resources, such as filters, synthesizers and the like are settled according to the PUP event sent in telegram T5. At the same time, beginning concurrently with the first serial control telegram, digital ramp data may be sent from a baseband processor to the transceiver. After transmission of such ramp data, speech data corresponding to initial slots of a multi-slot communication (e.g., slots 1 and 2) may next be sent over the digital interface. Thus as shown in the embodiment of FIG. 4, transmission of the serial control telegrams occurs concurrently with the transmission of digital ramp data and at least one initial slot of speech data. However in other embodiments, serial control information may be sent prior to at least some of the digital data on the digital interface.

Upon receipt of a second strobe signal at time TI3, the transceiver transitions into a transmit state, initiated via a switch (SWx) event and a power amplifier enable event (PAE), which occurs shortly after the second strobe signal. Next, as shown in FIG. 4 at a third strobe signal at TI4, the transmitter modulator is enabled according to the modulator enable event (MDE). Thus as shown in FIG. 4, the power amplifier ramps up and begins transmitting signals according to the ramp data. Upon receipt of a fourth strobe signal at time TI5, the modulator is disabled (i.e., according to the MDD event received in telegram T7). Additional actions to transmit additional slots of the multi-slot communication may be initiated according to additional strobe signals. As shown in FIG. 4, preferably these strobe signals are received in the transceiver during periods of RF inactivity (e.g., after receipt of a transmit modulator disable event and before receipt of a next transmit modulator enable event). As further shown in FIG. 4, additional data symbols may be provided over the digital interface from the baseband processor to the transceiver during a multi-slot communication. Preferably, as shown in FIG. 4, these data symbols are sent during periods of RF inactivity.

Thus the transceiver ramps up and transmits data according to a selected modulation scheme. For example, in some embodiments, a GMSK or an 8 PSK modulation scheme may be used. In embodiments implementing 8 PSK modulation, a transceiver may include or be coupled to linear power amplifiers to provide for linear control of the modulation scheme. Use of such linear amplifiers may allow for reduced amounts of control information to be sent from baseband processor to a transceiver for controlling the power amplifiers.

In yet other embodiments, a combination of such modulation schemes may be implemented in which each slot may independently vary between GMSK modulation and 8 PSK modulation. Note that between strobe signals, the transceiver may be controlled using events provided in the serial control telegrams that are scheduled at particular time periods (e.g., at a given number of Qbits) from the previous strobe signal. Accordingly, as shown in FIG. 4, the power amplifier is ramped up and ramped down to transmit modulated data in four transmit slots (as shown in FIG. 4). The data transmitted is shown as being sent from the baseband processor to the transceiver at various times prior to its transmission from the antenna along the data interface path between the baseband processor and the transceiver.

While shown with this particular implementation in the embodiment of FIG. 4, it is to be understood the scope of the present invention is not so limited, and different control telegrams may be sent including different events and other information at different times with respect to a transmit session.

Figure 5:
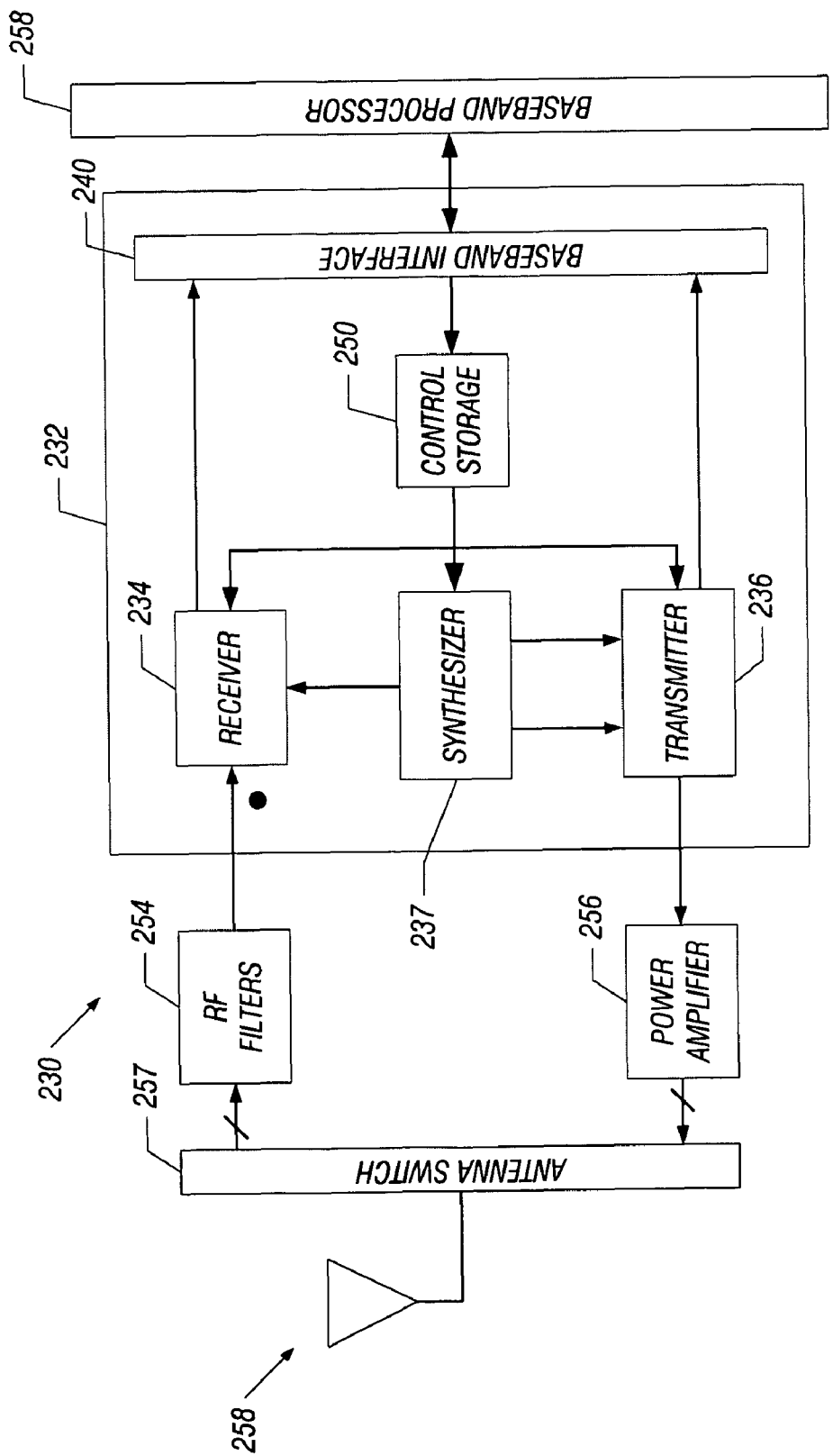
FIG. 5 is a block diagram of a transceiver in accordance with one embodiment of the present invention.

Referring now to FIG. 5, shown is block diagram of a transceiver in accordance with one embodiment of the present invention. Such a transceiver may be a CMOS transceiver for quad-band GSM/GPRS wireless communications such as for use in cellular handsets and wireless data modems, although the scope of the present invention is not so limited.

As shown in FIG. 5, a transceiver 232 may be incorporated into a wireless system, such as the exemplary wireless system 230. Transceiver 232 may include a receiver 234 and a transmitter 236. Receiver 234 may be a heterodyne or a homodyne receiver may include a low intermediate frequency (IF) architecture. In some embodiments of the invention, transmitter 236 may be a direct up or heterodyne transmitter. For embodiments of the invention in which transmitter 236 is a heterodyne transmitter, the heterodyne transmitter may incorporate an offset phase locked loop (PLL) architecture.

As depicted in FIG. 5, in some embodiments of the invention, a synthesizer 237 of transceiver 232 may provide a radio frequency (RF) lock oscillator signal to receiver 234; and furthermore, synthesizer 237 may provide both an RF local oscillator signal and an IF local oscillator signal to transmitter 236. Depending on the particular embodiment of the invention, synthesizer 237 may incorporate an RF PLL or an IF PLL or a combination of both of these components. The main function of synthesizer 237 is to provide local oscillator signals to receiver 234 and transmitter 236. These local oscillator signals, in turn, may be generated by synthesizer 237 in response to a clock reference signal (not shown in FIG. 5).

As further shown in FIG. 5, a baseband interface 240 forms an interface to a baseband processor 258, in some embodiments of the invention. Baseband interface 240 may be a digital interface, an analog interface or a combination of a digital and an analog interface, depending on the particular embodiment of the invention. For example, baseband interface 240 may include a digital data interface and a digital control interface, such as that described above with regard to FIG. 1.

Also shown in FIG. 5 is a control storage 250 within transceiver 232. Control storage 250 may be coupled to receive and store various configuration information, event information, schedule code information, and in some embodiments, may further include one or more tables to store particular configuration information that can then be accessed during operation via event information. As shown in FIG. 5, control storage 250 is further coupled to provide information therefrom to receiver 234, synthesizer 237 and transmitter 236. Furthermore, while not shown for ease of illustration in FIG. 5, configuration information from control storage 250 may further be coupled to power amplifiers 256 and RF filters 254, an antenna switch 257 and an antenna 258, to control these components as desired.

While shown in FIG. 5 as including the particular components shown therein, it is to be understood that in other embodiments, transceiver 232 may include additional and/or different components, and the embodiment shown in FIG. 5 is for illustrative purposes.

Figure 6:
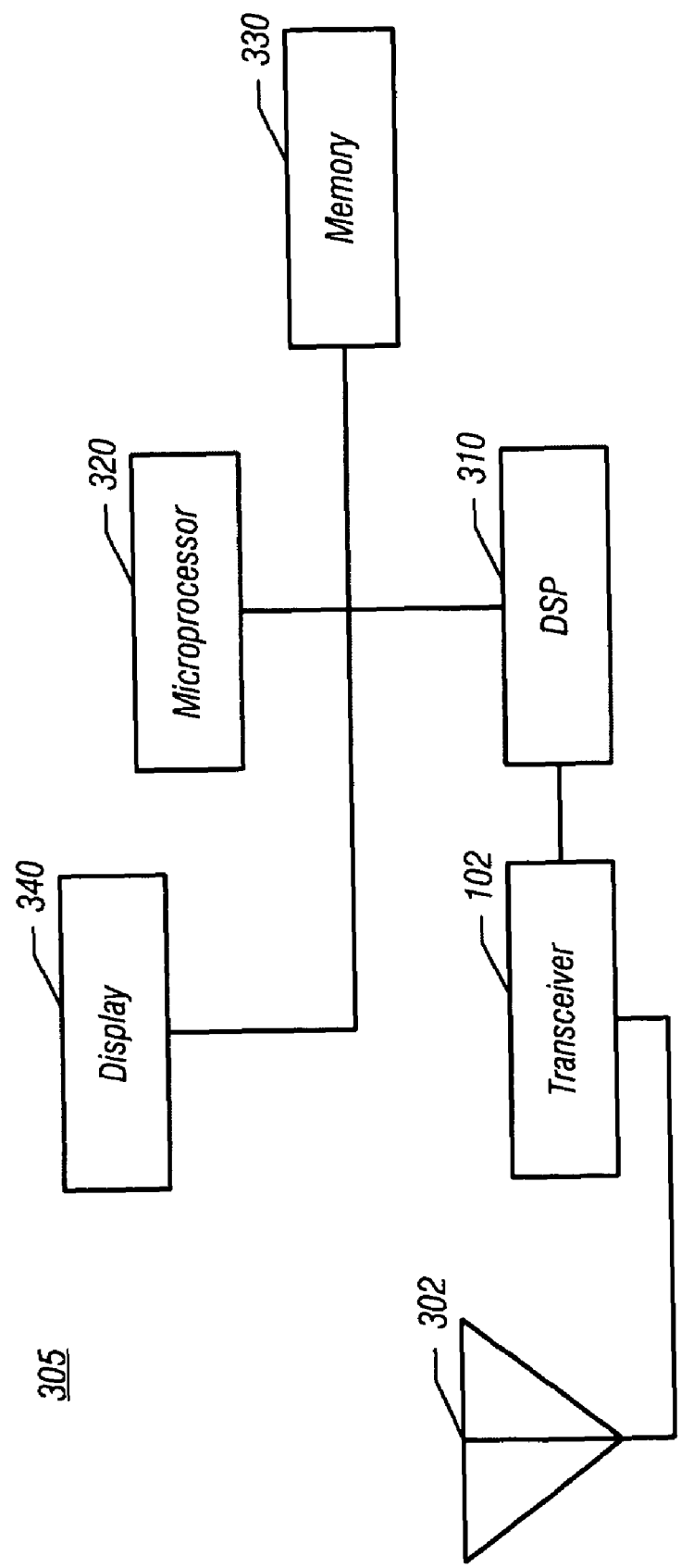
FIG. 6 is a block diagram of a system in accordance with one embodiment of the present invention.

Referring now to FIG. 6, shown is a block diagram of a system in accordance with one embodiment of the present invention. As shown in FIG. 6, system 305 may be a cellular telephone handset, although the scope of the present invention is not so limited. For example, in other embodiments, the system may be a pager, personal digital assistant (PDA) or other such device. As shown, an antenna 302 may be coupled to a transceiver 102, such as the transceiver shown in FIG. 5. In turn, transceiver 102 may be coupled to a digital signal processor (DSP) 310, which may handle processing of baseband communication signals. In turn, DSP 310 may be coupled to a microprocessor 320, such as a central processing unit (CPU) that may be used to control operation of system 305 and further handle processing of application programs, such as personal information management (PIM) programs, email programs, downloaded games, and the like. Microprocessor 320 and DSP 310 may also be coupled to a memory 330. Memory 330 may include different memory components, such as a flash memory and a read only memory (ROM), although the scope of the present invention is not so limited. Furthermore, as shown in FIG. 6, a display 340 may be present to provide display of information associated with telephone calls and application programs. Although the description makes reference to specific components of system 305, it is contemplated that numerous modifications and variations of the described and illustrated embodiments may be possible. It is to be understood that transceiver 102 and DSP 310 may conform to the transceiver and baseband processor depicted in FIG. 1, in one embodiment. Furthermore, transceiver 102 may include an article in the form of a machine-readable storage medium (or may be coupled to such an article, e.g., memory 330) onto which there are stored instructions and data that form a software program. The software program may be implemented by transceiver 102 to perform activities according to configuration information received from DSP 310.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An article comprising a machine-readable storage medium including instructions that if executed enable a system to:

receive digital control information in a transceiver of the system from a processor of the system, the digital control information including configuration information to configure the transceiver, event information including event codes to identify actions to be taken by the transceiver, and schedule information including schedule codes each to identify timing of a corresponding one of the actions to be taken by the transceiver;

store the digital control information in at least one storage of the transceiver;

configure the transceiver according to the configuration information; and perform a modulator control operation according to a first event code at a time relative to a previous operation according to a first schedule code, the first schedule code corresponding to a period of time after the previous operation, and perform a ramp operation according to a second event code at a time according to a second schedule code, wherein the second schedule code corresponds to a number of clock signals after the modulator control operation.

2. The article of claim 1, further comprising instructions to receive the event information and the schedule information from the processor and store the event information and the schedule information in an event storage of the transceiver.

3. The article of claim 2, further comprising instructions to reconfigure the transceiver according to the event information and the schedule information.

4. The article of claim 1, wherein the first schedule code corresponds to receipt of a first strobe signal in the transceiver.

5. The article of claim 4, wherein the second schedule code corresponds to a predetermined time after receipt of the first strobe signal.

6. A apparatus comprising:
a digital control interface to receive digital control information from a baseband processor;
an event storage coupled to the digital control interface to store at least a first portion of the digital control information received from the baseband processor, the event storage including:
a plurality of registers each to store an event code and a corresponding schedule code;
a configuration storage coupled to the digital control interface to store at least a second portion of the digital control information received from the baseband processor, the configuration storage including:
a receive configuration storage; and
a transmit configuration storage; and
a non-volatile memory coupled to the configuration storage, the non-volatile memory including predetermined configuration information including a plurality of transmit patterns, wherein the non-volatile memory is accessible using a first event code received in the digital control information at a time according to a first schedule code received in the digital control information.

7. The apparatus of claim 6, wherein the configuration storage is to store transmit configuration information received in at least one serial telegram while the apparatus is in a standby state.

8. The apparatus of claim 7, wherein the event storage is to store a plurality of event codes and a plurality of corresponding schedule codes received in the at least one serial telegram while the apparatus is in the standby state.

9. The apparatus of claim 6, wherein a synthesizer of the apparatus is to initiate operation responsive to a strobe signal and based on an event code and a schedule code stored in the event storage.

10. The apparatus of claim 6, wherein the apparatus is to receive a plurality of strobe signals during a period of radio frequency inactivity to initiate one or more actions in the apparatus after the period of radio frequency inactivity.

11. The apparatus of claim 10, wherein the apparatus includes instructions to perform a transmit or receive operation based upon an event code and a schedule code responsive to one of the plurality of strobe signals.

12. The apparatus of claim 6, wherein the event storage is to route a received event code to a selected one of the plurality of registers according to address information sent in a telegram including the received event code.

13. A system comprising:
a transceiver to transmit and receive wireless data via at least a first modulation scheme and a second modulation scheme, the transceiver having a digital interface to communicate digital control information between a baseband processor and the transceiver, a control storage coupled to the digital interface to store the digital control information received from the baseband processor, the control storage including a plurality of locations to store an event code and a corresponding schedule code, the transceiver further having a non-volatile memory to store a plurality of transmission patterns, the non-volatile memory to be addressed by an event code stored in one of the plurality of locations of the control storage at a time according to the corresponding schedule code;
a power amplifier coupled to the transceiver;
an antenna coupled to the power amplifier via an antenna switch to transmit and receive wireless data; and
the baseband processor coupled to the transceiver to provide the digital control information to the transceiver.

14. The system of claim 13, wherein the transceiver is to perform actions based on the digital control information at time instants according to the digital control information and strobe signals received from the baseband processor.

15. The system of claim 13, wherein the first modulation scheme comprises an 8 PSK mode and the second modulation scheme comprises a GMSK mode, and wherein each transmission slot can independently vary between the 8 PSK mode and the GMSK mode.

16. The system of claim 13, wherein the transceiver is to receive first symbol information for at least one slot of a transmission in a settling period before the transmission.

17. The system of claim 16, wherein the transceiver is to receive second symbol information for at least a second slot of the transmission in a period of radio frequency inactivity after transmission of the first symbol information.

* * * * *